Patented Sept. 1, 1936

2,053,228

UNITED STATES PATENT OFFICE 2,053,228

MOLDING COMPOSITIONS FROM UREA AND SOLID POLYMERIC ALDEHYDES AND PROCESS OF MAKING THE SAME

Otto Süssenguth, Erkner, near Berlin, Germany, assignor, by mesne assignments, to Bakelite Corporation, New York, N. Y., a corporation of Delaware No Drawing. Application July 10, 1929, Serial No. 377,331. In Germany September 11, 1928

2 Claims. (Cl. 106—22)

According to the process described in the application Serial No. 334,601 filed January 23, 1929, now Patent No. 1,996,087 molded articles can be manufactured from urea or its derivatives and aldehydes by causing these components to react in a dry state. The process consists in the mixing in a ball mill or other suitable device of urea, solid polymeric aldehydes such as paraformaldehyde, and suitable organic or inorganic filling bodies such as cellulose, cellulose derivatives, wood flour, asbestos, kaolin, graphite, etc., until an intimate, homogeneous mixture is obtained, thereupon molding articles from the mixture under hot press conditions in the manner known in the art. As a modification described in that application for example 100 parts by weight of urea, 100 parts of paraformaldehyde, 200 parts of lithopone, 100 parts of paper pulp and 50 parts of phenol-formaldehyde resin are mixed under heat in the kneading machine until a mass is obtained which is brittle when cooled. The mass is ground and hot pressed. I have found that it is possible and advantageous to manufacture the molded articles in such a way that the condensation between urea and solid polymeric aldehydes is carried out in the presence of molten organic compounds, particularly compounds not capable of hardening or more difficultly capable of hardening than condensation products from urea and formaldehyde. After the condensation the molding is carried out by pressing and applying heat simultaneously or subsequently. My invention relates to such process and furthermore to new molding mixtures manufactured as described hereafter.

As molten organic compounds natural or artificial resins, both those capable and those incapable of hardening such as colophony, copal, condensation products from mono- or polyhydric phenols, glycerine ester of phthalic acid, etc., may be used. The condensation products may be used as well in the form of resols as of resitols. Furthermore other organic compounds may be used, such as hydrocarbons, for instance anthracene, naphthalene, hydrogenated or nitrated naphthalenes, animes, etc., which do not adversely influence the course of the reaction and the properties of the products formed. The substances may also be used mixed with one another. Besides substances may be used such as hydrogenated or chlorinated hydrocarbons which act as plastifiers, such as chlorinated naphthalene. The condensation between urea and aldehydes may also be carried out in the presence of liquid, high boiling organic compounds which give to the final product a flexible character.

Furthermore I have found that the reaction between urea and solid polymeric aldehydes may be accelerated or retarded respectively by adding suitable contact substances. It may for instance be desirable to retard the course of the reaction if it is desired to keep the reaction mass thinly liquid for a longer time for the purpose of adding much porous or fibrous filling material in order to give to the mixture a better flowing capacity. In such case basic substances, such as ammonia, calcium hydroxyde, hexamethylene tetramine or basic salts such as carbonate of sodium or such like, are added to the reaction mass. The acceleration of the course of the reaction and of the hardening on the other hand may be brought about by addition of acids or acid salts such as citric acid, acetic acid, hydrochloric acid, urea nitrate etc. Several accelerating or retarding contact agents may also be used mixed with one another, or several contact substances successively. The qualities of the molding mixtures, for example the time or the temperature for molding or the flowing capacity are affected by the admixture of the different contact agents.

Example 1

1 kilo of glycerine ester of phthalic acid is fused in a suitable manner and a mixture of 4 kilos of lithopone, 1 kilo of wood flour, 2 kilos of urea and 1,6 kilos of paraformaldehyde added thereto. The fusion is continued until a mass is obtained which is brittle when cooled. Such mass is then disintegrated and molded under hot press conditions. Thereby articles are obtained which are fast to light, have a great strength and a high polish.

Example 2

1 kilo of non-hardening phenol-formaldehyde resin is fused and worked up in the manner as indicated in Example 1 with urea, paraformaldehyde and filling bodies.

Example 3

1 kilo of colophony is fused and further worked up with urea, paraformaldehyde and filling bodies as indicated in Example 1.

Example 4

1 kilo of phenol-formaldehyde resin is fused and mixed with 100 g. of triphenylphosphate and worked up as described in Example 1, with urea, paraformaldehyde and filling bodies. The molding of the mass obtained may be carried out with simultaneous employment of pressure and heat, or the mass may be pressed without employment of heat, thereupon subjecting the molded articles to heat at 100–120 degrees C.

Example 5

1 kilo of glycerine ester of phthalic acid is fused in a suitable manner and mixed with a mixture of 4 kilos of lithopone, 1 kilo of wood flour, 2 kilos of urea, 1,6 kilos of paraformaldehyde and 5 g. of nitrate of urea. The fusion is continued until a mass is obtained which is brittle when cooled, thereupon grinding the mass and pressing it under heat.

By a suitable choice of medium in which the condensation is carried out, it is possible to increase considerably the chemical, physical and mechanical resistance of the molded articles. The present process has the further advantage that valuable products may be obtained in a short operation without any process of distillation and without any special care and that considerably less quantities of formaldehyde are used than are otherwise required. 1,5 mols of formaldehyde to each mol of urea are sufficient for the manufacture of products of high resistance. By using suitable filling bodies such as paper, asbestos, lithopone, articles of white colour and fast to light may be manufactured. By using fibrous filling substances the mixing with condensation products preferably must be carried out under heat in a kneading machine, or on mixing rollers or in other suitable devices. The molded articles may be colored, cheapened, improved or otherwise influenced by adding suitable filling bodies.

Before, during or after the condensation, that is to say at any suitable stage of the manufacture, aldehyde binding substances, water binding substances, dye-stuffs or filling bodies of any kind may be added to the reaction mass.

Instead of urea also its derivatives such as thiourea or acetyl urea and instead of paraformaldehyde other suitable solid polymeric aldehydes such as trioxymethylene, polyoxymethylene may be used. The terms "urea" and "solid aldehydes" used in this specification relate to all such compounds. The present invention is neither limited to the use of urea nor to the use of paraformaldehyde and is furthermore not limited to the quantities indicated as examples and to the special process of mixing, molding and hardening as described above. The term "filling bodies" as used in this specification comprises likewise the dye-stuffs, plasticizing agents and the other usual additions.

I claim:

1. Process of preparing a composition suitable for molding including a resinous reaction product of a urea with a non-aqueous aldehyde as a bonding agent which comprises fusing a phenolic resin of fusible character that is solid at room temperature and less readily hardenable by heat than the condensation product of the urea with the aldehyde, adding to the fused resin a urea and a non-aqueous aldehyde, including a filler in the fused mass, maintaining the fused condition until a product is obtained that is brittle when cold, cooling and disintegrating the cooled mass.

2. Resinous product of the urea type suitable for molding comprising that obtained by the condensation of a urea with a non-aqueous aldehyde in the presence of a fluxing agent comprising a fusible phenolic resin solid at room temperature and less readily hardenable by heat than the urea condensation product.

OTTO SÜSSENGUTH.